United States Patent [19]

Devine

[11] 4,409,659
[45] Oct. 11, 1983

[54] PROGRAMMABLE POWER SUPPLY FOR ULTRASONIC APPLICATIONS

[75] Inventor: Janet Devine, Downingtown, Pa.

[73] Assignee: Sonobond Ultrasonics, Inc.

[21] Appl. No.: 216,081

[22] Filed: Dec. 15, 1980

[51] Int. Cl.³ .............................................. G06F 15/46
[52] U.S. Cl. ..................... 364/475; 82/2 B;
228/1 R; 228/110; 364/508; 364/511; 408/700
[58] Field of Search ............... 364/474, 475, 508, 511;
318/116, 118; 82/2 B, DIG. 9; 408/17, 700;
29/DIG. 46, 730, 629.1; 83/72, 74; 228/102,
103, 110, 111, 1 R, 1 A, 1 B, 8, 9; 310/26, 314

[56] References Cited

U.S. PATENT DOCUMENTS

| | | | |
|---|---|---|---|
| 2,891,180 | 6/1959 | Elmore | 310/26 |
| 2,946,119 | 7/1960 | Jones et al. | 29/470 |
| 3,002,270 | 10/1961 | DePrisco | 29/470 |
| 3,158,928 | 12/1964 | DePrisco et al. | 228/102 |
| 3,184,353 | 5/1965 | Balamuth et al. | 156/73.1 |
| 3,209,447 | 9/1965 | Jones | 29/470 |
| 3,212,695 | 10/1965 | MacGregor | 228/102 X |
| 3,257,721 | 6/1966 | Jones | 29/470 |
| 3,283,182 | 10/1966 | Jones et al. | 310/8.7 |
| 3,367,809 | 2/1968 | Soloff | 156/73 |
| 3,440,118 | 4/1969 | Obeda | 156/73 |
| 3,466,970 | 9/1969 | Jones | 90/11 |
| 3,514,342 | 5/1970 | Brennan | 136/176 |
| 3,607,580 | 9/1971 | Obeda | 156/580 |
| 3,640,180 | 2/1972 | Maropis | 90/11 R |
| 3,662,454 | 5/1972 | Miller | 29/470.1 |
| 3,772,089 | 11/1973 | Bennett et al. | 136/175 |
| 3,775,189 | 11/1973 | Jaggard | 136/175 |
| 3,822,465 | 7/1974 | Frankort et al. | 29/470.1 |
| 3,848,792 | 11/1974 | Mims | 228/1 |
| 3,850,776 | 11/1974 | Karobath et al. | 156/475 |
| 3,872,285 | 3/1975 | Shum et al. | 364/508 X |
| 3,889,166 | 6/1975 | Scurlock | 318/116 |
| 3,988,169 | 10/1976 | McLean | 29/623.1 |
| 4,026,000 | 5/1977 | Anderson | 29/730 |
| 4,117,211 | 9/1978 | Schuster et al. | 429/121 |
| 4,118,139 | 10/1978 | Lemelson | 408/700 X |
| 4,164,068 | 8/1979 | Shropshire et al. | 29/623.1 |
| 4,190,702 | 2/1980 | Pun et al. | 429/4 |

FOREIGN PATENT DOCUMENTS

| | | | |
|---|---|---|---|
| 30606 | 6/1981 | European Pat. Off. | 82/DIG. 9 |
| 661644 | 4/1963 | Canada | 82/DIG. 9 |
| 2141039 | 12/1977 | Fed. Rep. of Germany | 408/17 |
| 1222159 | 2/1971 | United Kingdom | 364/474 |

OTHER PUBLICATIONS

Sonobond Bulletin "Sonoweld Ultrasonic Welding Equipment MH-1540".
Sonobond Bulletin "Ultrasonically Assisted Machining of Aircraft Parts".
Sonobond Bulletin 37 Models FSA-2012 Ultrasonic Free Standing Armature Welding".
Assembly Engineering Magazine "Ultrasonic Welding Its Principles, Requirements and Uses".
Assembly Engineering "Ultrasonics Produces Strong, Oxide-Free Welds".
Sonobond Bulletin "Ultrasonic Solid-State Bonding of Aircraft Structures".
Sonobond Bulletin "Ultrasonic Welding of Motor Armatures".

Primary Examiner—Joseph F. Ruggiero
Attorney, Agent, or Firm—Austin R. Miller

[57] ABSTRACT

This method provides methods and apparatus for programmably regulating power provided to ultrasonically vibrate a metal-cutting tool, with power being regulated as a function of physical parameters measured during the cutting operation which are indicative of progress of the tool cutting the workpiece. The methods and apparatus regulate the power input to vibrate the tool in response to one or more sensed physical parameters to maintain the parameter(s) within preselected limits indicative of satisfactory cutting by the tool.

20 Claims, 12 Drawing Figures

PROGRAMMABLE POWER SUPPLY FOR ULTRASONIC APPLICATIONS

CROSS-REFERENCE TO RELATED PATENT APPLICATION

Reference is made herein to pending United States patent application Ser. No. 184,840, filed Sept. 8, 1980 for "Power Supply Having Automatic Frequency Control for Ultrasonic Bonding" submitted by R. A. Sullivan and assigned to Sonobond Corporation.

BACKGROUND OF THE INVENTION

1. Field of the Invention

This invention relates to providing electrical power to means for converting electrical power into ultrasonic frequency mechanical vibrations. While the invention has wide application, one use to which the invention is particularly suited is as a power supply to produce power for input to apparatus for ultrasonically mechanically vibrating a metal cutting tool as the tool cuts a workpiece.

2. Description of the Prior Art

Apparatus for delivering ultrasonic vibratory energy to a work-performing tool is disclosed in U.S. Pat. No. 3,640,180. Other patents relating to ultrasonic applications are U.S. Pat. Nos. 2,891,178; 2,891,180; 3,209,447; 3,283,182; and 3,466,970.

Ultrasonic vibration is commonly applied to metal-cutting tools to enhance the performance of the metal-cutting tools when mounted on metalworking machinery such as lathes. The machine operator may attempt manually to adjust tool vibrational frequency and/or tool vibrational amplitude if the operator observes that the cutting tool is excessively hot or that the cutting effect being achieved is not adequate. An excessively hot cutting tool will change color. Inadequate cutting effect is manifested as visible and/or audible slowdown of the metalworking machine.

Adjustment of cutting tool vibrational frequency and/or amplitude is a trial and error procedure. The machine operator may have data reflecting estimated tool loads for various types of cuts. This data may have been gathered by measuring power consumption of the lathe drive motor and correlating consumption with the type and quality of cut.

It is desirable to select both "mechanical" power input to the metalworking machine drive motor and ultrasonic power controlling vibrational amplitude of the cutting tool to provide the fastest, highest quality cut of the workpiece with minimal energy consumption. (As used herein, "mechanical" power denotes the power consumed by the metalworking machine drive motor.)

In general, a high degree of machine operator judgment is required to regulate machine operation and to regulate power input to the ultrasonic vibration means in which the cutting tool is mounted.

Typically, an operator will have recommended settings, based on past experience, for ultrasonic power and tool cutting speed (which defines power input to the machine) as a function of tool type, tool grade, cut geometry and type of cut, i.e. rough or finished. After consulting his handbook of recommended settings, the operator starts the machine, makes a cut and then may adjust the machine speed based on his observation of color of the cutting tool, color of metal chips removed by the tool and any discoloration of the workpiece occurring during cutting.

If the operator is utilizing ultrasonic vibration of the cutting tool, an additional judgement and adjustment may be required. If the cut is proceeding unsatisfactorily, the operator must evaluate whether there is too much or too little ultrasonic power and/or too much or too little mechanical power being input to the metalworking machine. Based on his experience and subjective judgment, the operator may adjust the speed of the motor of the metalworking apparatus or the cutting speed, both of which affect the mechanical power consumed during cutting, and/or may adjust the ultrasonic power input to the apparatus which ultrasonically vibrates the cutting tool.

Various applications of ultrasonic bonding and machining are disclosed in the article "Ultrasonics Produces Strong, Oxide-Free Welds" appearing in the May 1977 issue of *Assembly Engineering*, the article "Ultrasonic Welding—Its Principles, Requirements, and Uses" appearing in a recent issue of *Assembly Engineering* and in the Sonobond Corporation publications "Ultrasonically Assisted Machining of Aircraft Parts" dated November, 1979, "Ultrasonic Freestanding Armature Welder", "Ultrasonic Solid-State Bonding of Aircraft Structures" dated July, 1977, and "Ultrasonic Welding of Motor Armatures."

SUMMARY OF THE INVENTION

This invention provides methods and apparatus for programmably regulating power provided to ultrasonically vibrate a metal-cutting tool, with power being regulated as a function of physical parameters measured during the cutting operation which are indicative of progress of the tool cutting the workpiece. The methods and apparatus regulate the power input to vibrate the tool in response to one or more sensed physical parameters to maintain the parameter(s) within preselected limits indicative of satisfactory cutting by the tool. The methods and apparatus sense one or more physical parameters to produce an analog signal corresponding to the sensed physical parameter. The analog signal is converted to a digital input signal. A digital output signal is generated based at least in part on digital input signal while measuring one or more of the physical parameters. The digital output signal is converted to an analog output signal while a time-varying line signal is rectified and filtered to produce an input pulse. An output square wave, having duty cycle defined by the input pulse is generated. An output pulse, whose phase relationship is defined by the output square wave, is generated and used to control a portion of a second time-varying line signal. The rectified second line signal drives the cutting tool vibrating apparatus.

The digital output signal is produced by computing a desired digital output utilizing algorithms reflecting previously observed cutting tool performance and relationship(s) thereof to the sensed physical parameter(s).

DESCRIPTION OF THE PREFERRED EMBODIMENTS

Figure 1:
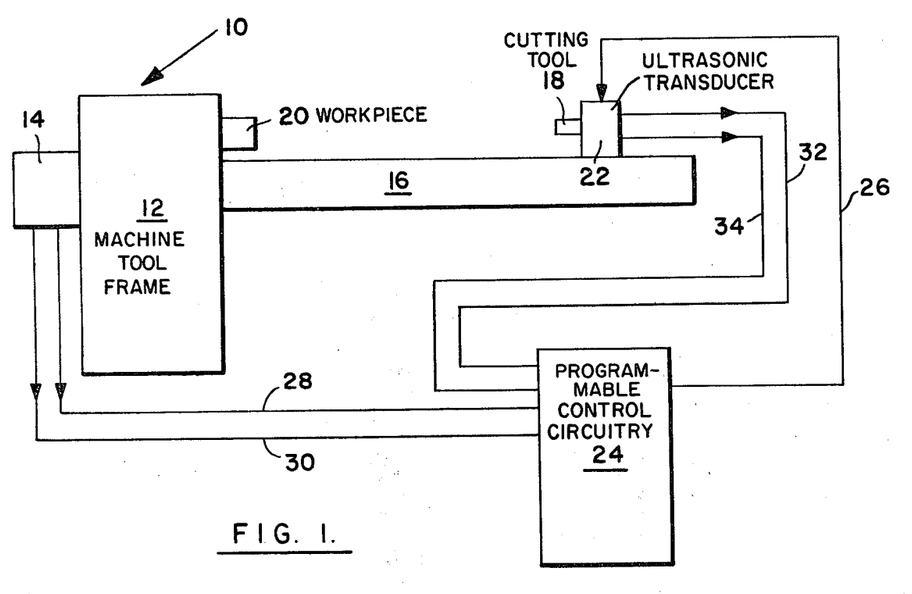
FIG. 1 is a schematic representation depicting the relationship between the programmable power supply of the invention and metalworking apparatus.

FIG. 1 presents a schematic representation illustrating interaction of circuitry of the invention with metalworking apparatus. In FIG. 1, metalworking apparatus is denoted generally 10, where the apparatus can be a lathe, milling machine or the like and generally includes frame 12, motor 14 and carriage 16 along which cutting tool 18 may be movable to contact workpiece 20. In general, motor 14 rotates workpiece 20 and effects longitudinal movement of cutting tool 18 along carriage 16 so that cutting tool 18 moves relatively to and in interference with workpiece 20, to cut the workpiece. Configuration of apparatus 10 is not critical; the invention has applicability to any metalworking apparatus which provides relative interfering motion between a metal workpiece and a cutting tool whereby the cutting tool cuts the workpiece.

Cutting tool 18 is mounted in vibration means 22 which receives an electrical signal from circuitry 24 and converts the electrical signal into mechanical vibration of cutting tool 18. Line 26 carries the signal from circuitry 24 to vibration means 22. Elements 10 through 22 are conventional; the invention resides in providing improvement in circuit apparatus and methods which enhance operation of these elements.

Sensors, not shown in FIG. 1, are provided to sense physical parameters indicative of progress of cutting tool 18 in cutting workpiece 20. The sensors may include means such as a thermocouple or thermistor for measuring temperature of cutting tool 18, means such as a strain gauge for measuring strain in cutting tool 18, means such as a tachometer for measuring the speed of drive motor 14 and means such as a wattmeter for measuring power consumed by motor 14. Other sensors sensing other parameters may also be provided.

Each sensor produces an output electrical signal proportional to the sensed physical parameter; conditioning circuitry is provided for each sensor to process the sensor output and amplify the output to produce DC voltage for subsequent processing according to the invention.

In FIG. 1 four lines have been denoted schematically for carrying output signals produced by the various sensors to circuitry 24 forming a part of the invention. Specifically, lines 28 and 30 from motor 14 to circuitry 24 carry DC output voltages respectively produced by a tachometer measuring rotational velocity of the output shaft of motor 14 and a wattmeter measuring power consumed by motor 14. Similarly, lines 32 and 34 carry signals respectively produced by a thermistor or thermocouple measuring temperature of cutting tool 18 and a strain gauge attached to tool 18.

Figure 2:
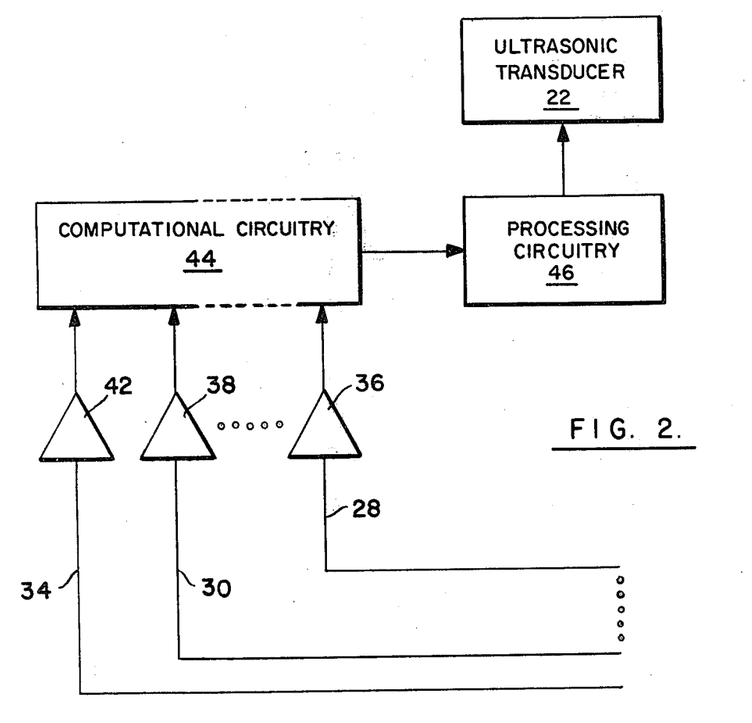
FIG. 2 is a schematic representation in block diagram form of the programmable power supply of the invention.

FIG. 2 illustrates three lines 28, 30, 34 carrying signals produced by the various sensors to amplifiers 36, 38, 42 forming a portion of conditioning circuitry associated with the various sensors. FIG. 2 also shows that signals output by the conditioning circuitry are input to computational circuitry 44 which in turn provides input to processing circuitry 46, which provides power to vibration means 22.

Optionally, an automatic frequency control power supply, such as described in co-pending United States patent application, Ser. No. 184,840, entitled "Power Supply Having Automatic Frequency Control for Ultrasonic Bonding," may be interposed between processing circuitry 46 and vibration means 22 to provide frequency control of the power provided to means 22. The apparatus and methods of the present invention are complemental to those disclosed and claimed in the co-pending application, with this invention providing a power supply having automatic power control for ultrasonic metalworking and ultrasonic bonding. The two inventions may be used with or independently of one another.

Figure 3A:
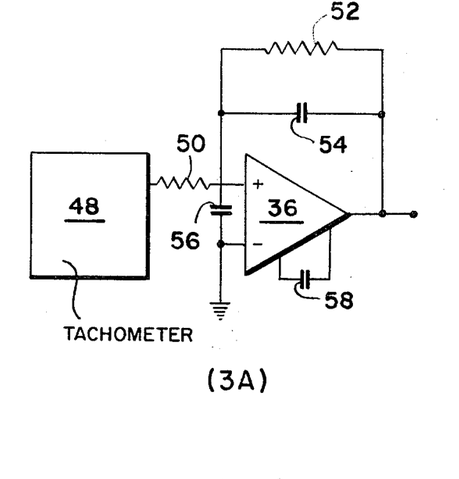
FIGS. 3A through 3D are schematic representations of various transducers and conditioning circuits therefor constituting a portion of the invention.
Figure 3B:
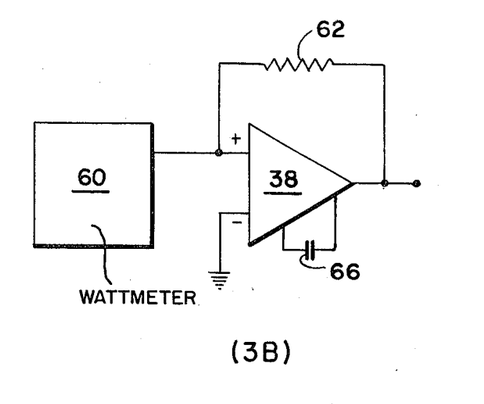
Figures 3C, 3D:
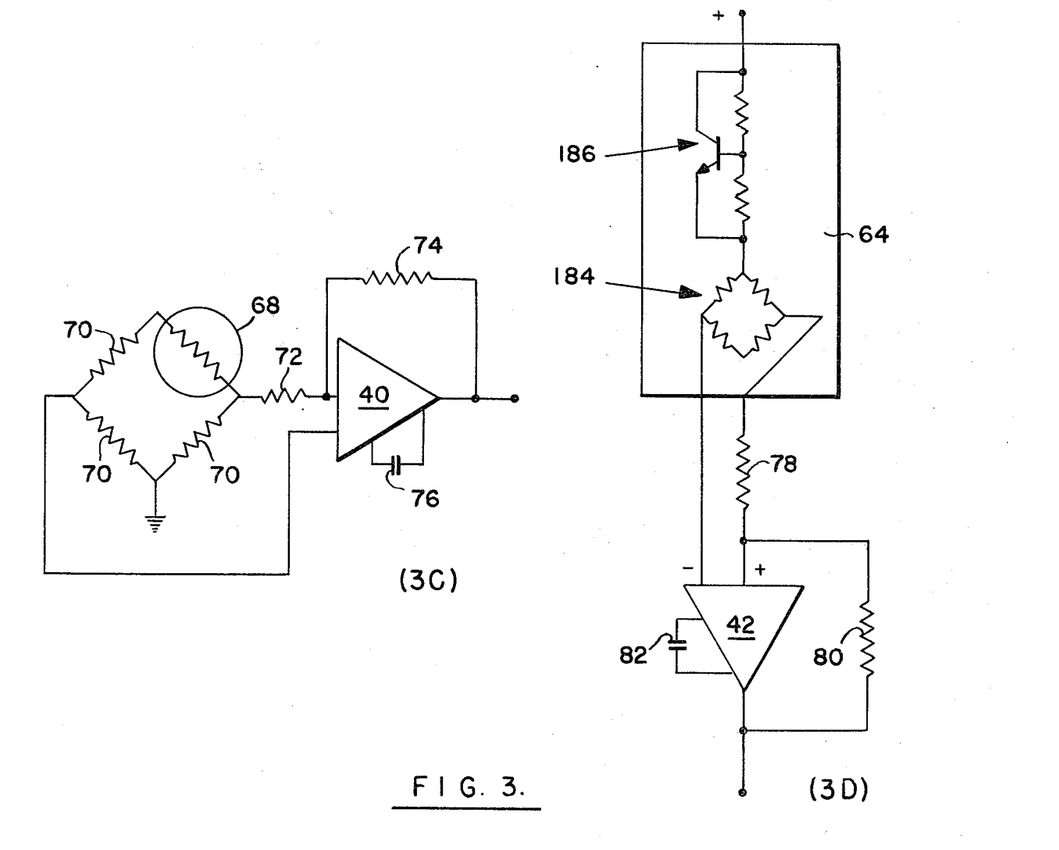

FIG. 3 shows in more detail conditioning circuits associated with transducer sensors, such as a tachometer, wattmeter, thermistor and strain gauge, used to sense physical parameters indicative of progress of cutting tool 18 in cutting workpiece 20.

FIG. 3A illustrates conditioning circuitry associated with a tachometer 48. The conditioning circuitry includes an integrating active filter comprising amplifier 36, resistors 50 and 52 and capacitor 54; this integrating active filter forms the tachometer output pulses into an analog DC signal. Capacitor 56 provides transient suppression while capacitor 58 frequency compensates amplifier 36. Gain of amplifier 36 is controlled by resistors 50 and 52, values of which are selected to provide the desired output voltage level.

FIG. 3B illustrates conditioning circuitry associated with a wattmeter 60 where the wattmeter is a Hall effect sensor. The conditioning circuitry includes a current-to-voltage converter consisting of resistor 62 and amplifier 38. A capacitor 66 frequency compensates amplifier 38; resistor 62 is selected to provide an analog signal of the desired output voltage level.

FIG. 3C illustrates conditioning circuitry associated with a thermistor 68. The thermistor conditioning circuitry includes a bridge dectector, consisting of resistors 70 connected with thermistor 68, providing an input through resistor 72 to amplifier 40. The combination of resistors 72 and 74 controls gain of amplifier 40 while capacitor 76 frequency compensates amplifier 40.

FIG. 3D illustrates conditioning circuitry associated with a strain gauge 64. The conditioning circuitry includes amplifier 42 whose gain is controlled by the combination of resistors 78 and 80 with capacitor 82 frequency compensating amplifier 42. Strain gauge 64 includes an internal bridge circuit designated generally 184 and an internal voltage regulator designated generally 186 which, in combination, provide required accuracy of the output of strain guage 64.

In each case the conditioning circuitry associated with the sensors 48, 60, 64 and 68 produces an analog signal having a desired output voltage level.

Figures 4, 8:
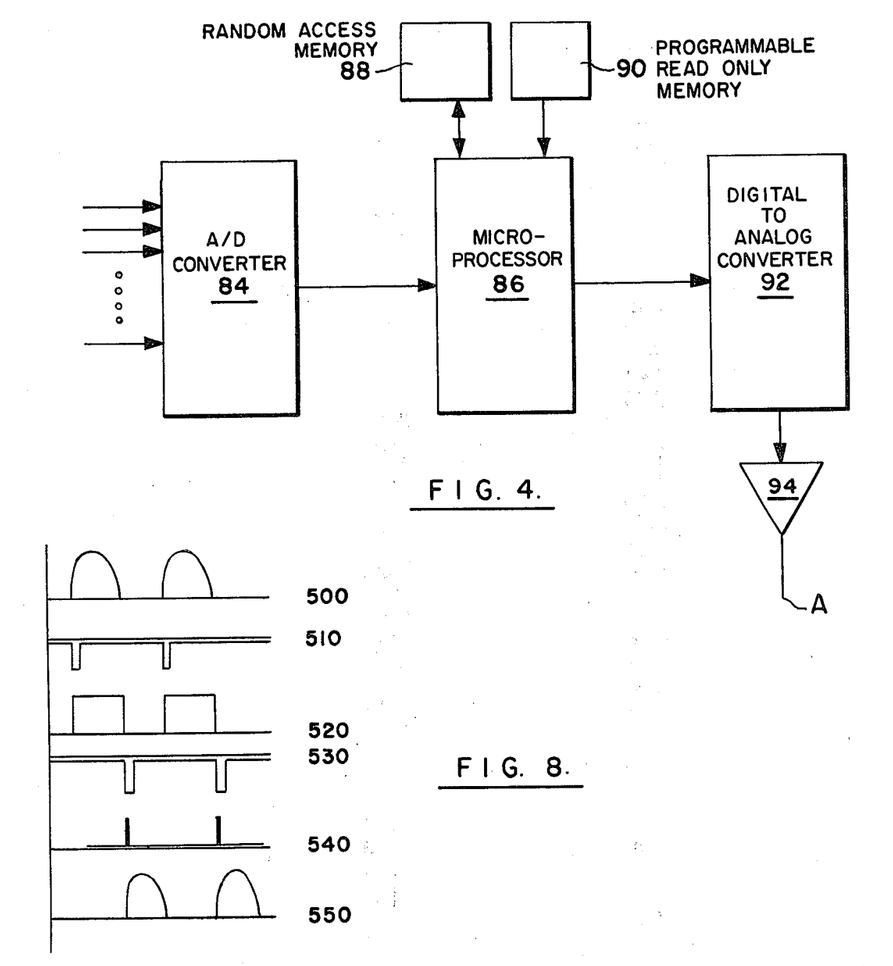
FIG. 4 is a schematic diagram, in block diagram form, depicting operation of a microprocessor forming a part of the programmable power supply of the invention.
FIG. 8 is a graphic representation of wave forms existing at selected points within circuitry of the invention.

FIG. 4 schematically illustrates computational circuitry designated generally 44 in FIG. 2. Computational circuitry 44 includes an analog to digital converter designated generally 84, a microprocessor based signal processor designated generally 86 connected to a random access memory designated generally 88 and to a programmable read-only memory designated generally 90, with output from the microprocessor being converted from digital to analog form by a digital to analog converter designated generally 92. Converter 92 provides an analog output signal, which is amplified by an amplifier designated generally 94 to the proper level, for input to the processing circuitry which was designated 46 when referring to FIG. 2.

Figures 5, 5A:
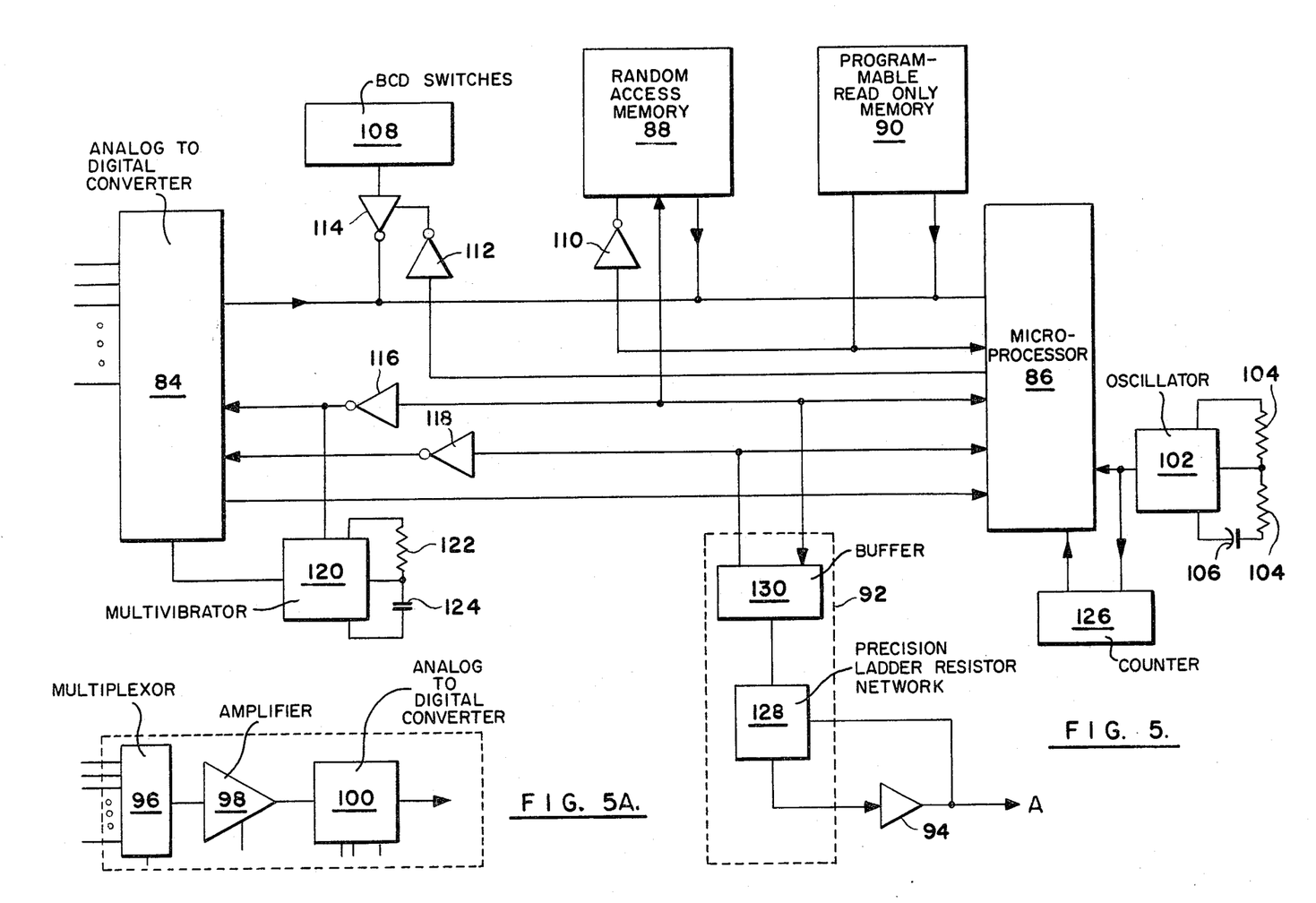
FIG. 5 is a schematic diagram illustrating certain elements of the microprocessor in greater detail.
FIG. 5A is a schematic diagram illustrating an analog-to-digital converter element of FIG. 5 in greater detail.

Referring to FIGS. 5 and 5A the analog to digital converter designated generally 84 includes a multiplexor 96 which selects an analog signal from one of the sensor output conditioning circuits. The selected signal is then frozen by a sample and hold amplifier 98 to provide the frozen signal to analog to digital converter 100, which converts the analog signal to a digital signal of 8 bit format proportional to the physical parameter measured by the sensor. This digital input signal is then provided to the microprocessor 86 and associated circuitry for computations.

The analog to digital converter designated generally 84 is available as a single integrated circuit; the HDAS-16 available from Datel Corporation may be used.

Computational circuitry 44 shown in FIG. 5 includes a microprocessor 86 coupled to a random access memory 88. The microprocessor determines proper control voltage to be provided to processing circuitry 46 as a function of the physical parameter(s) measured by one or more of the sensors as the cutting tool cuts the work piece. An oscillator 102 drives microprocessor 86, preferably at a clock frequency of 2 Mhz. Resistors 104 and capacitor 106 are chosen to provide the selected 2 Mhz frequency input to microprocessor 86. Microprocessor 86 may be any conventional eight bit microprocessor; the type designated Z80, which is widely commercially available, is suitable. A type 555 integrated circuit, which is also commercially widely available, may be used for oscillator 102.

Microprocessor 86 uses random access memory 88 to store digital values corresponding to each input voltage coming from a sensor and to store temporary results which occur during computations. Random access memory 88 preferably has a 256 byte capacity and is a static random access memory. A type 93477 random access memory, available from Fairchild Corporation, may be used.

The erasable programmable read-only memory 90 contains instructions enabling microprocessor 86 to compute the desired control voltage for input to the processing circuitry 46 based on parameter values measured by the sensors. Erasable programmable read-only memory 90 preferably has a 512 byte capacity. A type 2724 erasable programmable read-only memory, available from National Semiconductor Company, may be used.

Preferably, one or more binary coded decimal switches 108 are connected to microprocessor 86. Binary coded decimal switches 108 are actuated by the machine operator and allow the operator to make program changes in real time. Suitable binary coded decimal switches are available from many manufacturers.

Integrated circuits 110, 112, 114, 116 and 118 are logic gates insuring that only one device is in communication with microprocessor 86 at any time. Selection of the desired device for communication is controlled by microprocessor 86.

Integrated circuit 120 is a multivibrator having resistor 122 and capacitor 124 associated therewith which control length of pulses generated by multivibrator 120 for input to analog-to-digital converter 84. The commercially available integrated circuit commonly designated type 74123 can be used as the multivibrator. Once microprocessor 86 selects an input signal from a sensor for processing, multivibrator 120 insures that the output voltage of the sample and hold amplifier 98 has settled to an analog signal within predetermined limits before analog to digital conversion is initiated.

Integrated circuit 126 is preferably a 4 bit counter functioning as a watch dog timer. With a clock frequency of 2 Mhz provided by oscillator 102, timer 126 constrains microprocessor 86 to initialize calculations every sixth computation cycle. The forced restart prevents compounding of computation errors which can be caused by noise in the system and which, without restart, would result in an erroneous output control voltage with magnitude of the error growing with each computational cycle. A type 74193 integrated circuit, available from many manufacturers, is suitable for use as element 126.

Digital to analog converter 92 in FIG. 4 includes a precision ladder resistor network 128 and a data buffer 130 which function together as feedback elements for amplifier 94. Output of amplifier 94 is an analog signal provided as input at "A" to processing circuitry 46 in FIG. 2. A type 7520 digital to analog integrated circuit, available from Intersil Corporation, is suitable for use as ladder type resistor network 128. A type 7574 integrated circuit, available from many manufacturers, is suitable for use as data buffer 130.

During operation multiplexor portion 96 of analog to digital convertor 84 serially samples output signals produced by conditioning circuits associated with the sensors. Microprocessor 86 serially receives digital signals from converter 84 corresponding to the serially sampled sensor. Since convertor 84 continuously samples the sensor signals, new digital signals reflecting newly sensed values of the various parameters are continuously provided by convertor 84 to microprocessor 86. Consequently, microprocessor 86 continuously has fresh data from which to compute a digital output signal provided to convertor 92 thereby to define voltage at A.

Microprocessor 86 continuously calculates new digital outputs based on information stored in programmable read-only memory 90. Microprocessor 86 uses random access memory 88 for temporary storage of data and computed parameters during the computation process. The computations are performed according to externally programmed instructions fixed in memory 90. The instructions may be based on observed characteristics such as quality of the cut and/or on measured data such as cutting tool temperature and the like which have been previously correlated with tool performance. Microprocessor 86 may perform both logical decisions and arithmetic computations and decides, according to the preprogrammed instructions resident in memory 90, how to use each signal received from a sensor. Depending on the way binary coded decimal switches 108 are configured by the operator, microprocessor 86 may analyze some, all or only one of the sensor outputs.

Various input firmware instructions can be provided on different memory chips placed into memory 90. Differently programmed chips may be provided for different types of cuts, different types of cutting tools, different kinds of workpieces and the like. Once a chip is placed in memory 90, computations proceed based on instructions contained on that chip.

Figure 6:
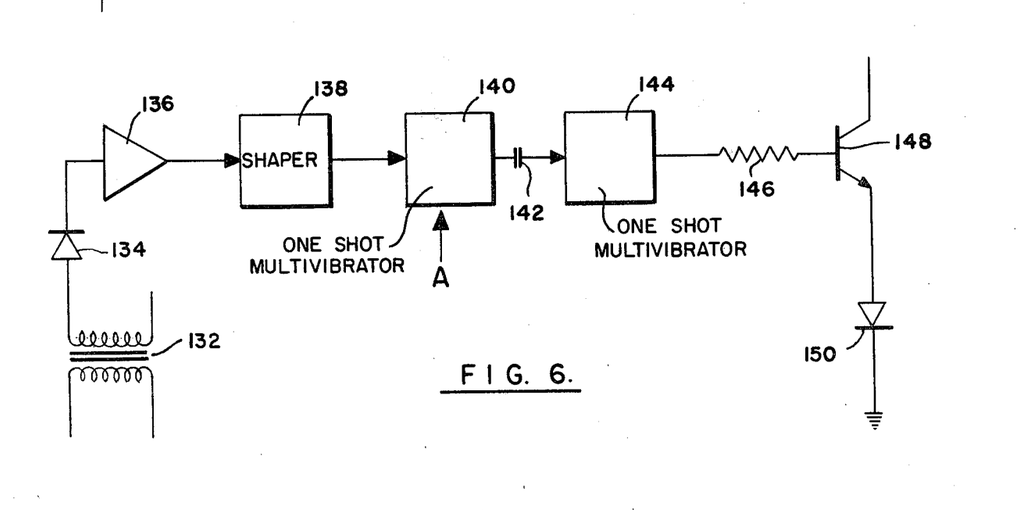
FIG. 6 is a block diagram of circuitry constituting a portion of the invention.
Figure 7:
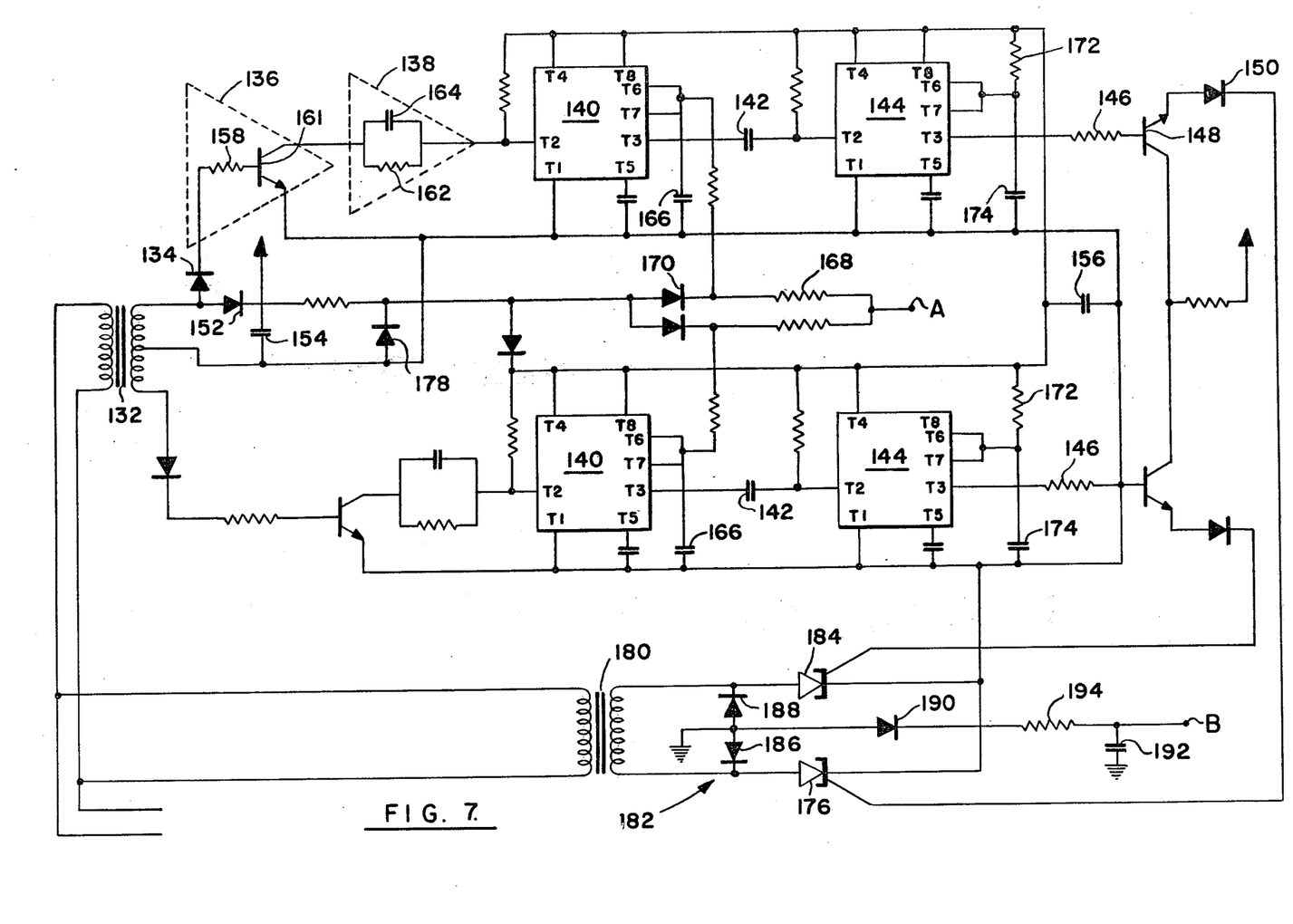
FIG. 7 is a circuit schematic in greater detail illustrating the portion of the invention shown schematically in FIG. 6.

FIG. 6 is a block diagram of the process circuitry of the invention while FIG. 7 presents a detailed circuit diagram of the processing circuitry.

Output voltage provided by the invention is varied by appropriately gating two silicon controlled rectifiers each of which reside in one-half of a bridge rectifier circuit. The gates of silicon controlled rectifiers are in turn controlled by a voltage controlled phase shift circuit; two identical phase shift circuits form part of the processing circuitry with each phase shift circuit driving one of the silicon controlled rectifiers.

Referring to FIGS. 6 and 8, half wave pulses represented as wave form 500 are provided from the secondary winding of transformer 132 via diode 134; the primary winding of tansformer 132 may be connected to 60 Hz line voltage. Half wave pulses 500 are inverted by an inverter 136 and shaped by shaper 138 into negative pulses represented as 510 in FIG. 8. The negative pulses are applied to a one-shot multivibrator 140 which produces a variable duty cycle square wave whose duty cycle depends on the control voltage provided at A by computational circuitry 44; the input control voltage is the output of amplifier 94 in FIG. 5. The variable duty cycle output square wave produced by multivibrator 140 is denoted 520 in FIG. 8. The square wave produced by multivibrator 140 is input through a capacitor 142 into a second one-shot multivibrator 144. The signal input to multivibrator 144 after passage through capacitor 142 is indicated as 530 in FIG. 8. Multivibrator 144 produces pulses, depicted as 540 in FIG. 8, which pass through resistor 146, are current amplified by transistor 148 and applied to a silicon controlled rectifier via a diode 150.

The magnitude of the control voltage provided at A by computational circuitry 44 and input to multivibrator 140 controls the width of gate pulses 540, triggering the silicon control rectifier to the "on" state at various points during the cycle of a 60 Hz signal thereby providing the variable output voltage produced according to the invention. Wave form 550 in FIG. 8 represents voltage measured across one of the gated silicon controlled rectifiers.

Referring specifically to FIG. 7 where processing circuitry 46 is shown in more detail, transformer 132 has its primary winding connected to time varying line voltage, typically 60 hertz 115 volt. Transformer 132 is a stepdown transformer providing a low voltage at the secondary winding; this low voltage is rectified and filtered by diode 152 and capacitors 154 and 156 to provide low voltage DC needed by various phase shift elements of the circuit. Diode 134 produces half wave input to inverter 136 defined by resistor 158 and transistor 161; the half-wave between diode 134 and resistor 158 appears as 500 in FIG. 8.

Resistor 162 and capacitor 164 in parallel combination define shaper 138 and together provide pulse shaping to produce sharp negative pulses for input to one shot multivibrator 140. The pulses after shaping by shaper 138 for input to multivibrator 140, appear as 510 in FIG. 7. Multivibrator 140 is preferably a type 555 integrated circuit timer whose output is controlled by the DC voltage level at control terminals T6 and T7; this voltage is in turn controlled by capacitor 166. The DC voltage applied to multivibrator 140 through resistor 168 and diode 170 regulates multivibrator 140 to define the portion of the period of one cycle at which multivibrator 140 produces output at terminal T3.

Output voltage provided by multivibrator 140 at T3 is applied to input terminal T2 of a second one shot multivibrator 144 through capacitor 142. Multivibrator 144 is preferably a second type 555 timer configured as a one shot multivibrator where the output pulse width produced at terminal T3 of vibrator 144 is defined by the combination of resistor 172 and capacitor 174.

Output pulses at terminal T3 of second multivibrator 144 may appear at any point during a half cycle of the line voltage; their position with respect to the cycle is defined by the output voltage furnished by amplifier 94 in FIGS. 4 and 5. The input wave formed at terminal T2 of multivibrator 144 appears as 530 in FIG. 8 while the output wave produced at terminal T3 of multivibrator 144 appears as 540 in FIG. 8. The output pulse train provided by multivibrator 144 is applied to current amplifying transistor 148 through resistor 146. Transistor 148 provides current pulses through diode 150 to gate silicon controlled rectifier 176.

For both multivibrators 140 and 144 terminals T1 provide ground for the integrated circuit. Terminal T5 is a control voltage input to the circuit. The capacitors in the leads to terminals T5 filter any noise in the input signal to terminal T5.

Zener diode 178 provides a stable reference against which voltage output from amplifier 94, appearing at A in FIG. 7, may be compared.

Transformer 180 has its primary winding connected to the same source of line voltage as the primary winding of transformer 132. The secondary winding of transformer 180 is connected via end taps to a diode and silicon controlled rectifier bridge designated generally 182 which includes silicon controlled rectifier 176, silicon controlled rectifier 184 and diodes 186 and 188. Output voltage from bridge 182 is filtered by capacitor 192 acting with current limiting resistor 194; the output voltage appears at B in FIG. 7.

The filtered output voltage is applied to a power amplifier which provides input power to vibration means 22 shown in FIG. 1. Output voltage from the power amplifier is a function of where silicon controlled rectifiers 176 and 184 are gated with respect to the period of the wave input to the primary of transformer 180. Gating of silicone controlled rectifiers 176 and 184 is in turn controlled by voltage applied to multivibrators 140 and 144 via terminals T6 and T7 which in turn is defined by the voltage output from amplifier 94 connected to microprocessor 86.

Silicon controlled rectifier 184 is driven by a second processing circuit identical to the described above as driving silicon controlled rectifier 176. The analogous elements in the second processing circuit driving silicon controlled rectifier 184 are denoted by identical numbers and have a prime notation affixed thereto. Both of these processing circuits are connected to the secondary coil of transformer 132; the two processing circuits operate in response to respective positive and negative polarity voltages provided by the secondary coil of transformer 132.

I claim:

1. In a method of metalworking comprising the steps of:

(a) providing relative interfering motion between a metal workpiece and a cutting tool whereby said cutting tool cuts said workpiece; and
(b) vibrating said tool, by application thereto of ultrasonic vibratory energy, to enhance tool cutting action:
the improvement comprising:
(c) sensing a physical parameter indicative of progress of said tool in cutting said workpiece while said tool is cutting and workpiece; and
(d) changing vibrational amplitude of said tool, while said tool is cutting said workpiece, in response to a continuously mathematically calculated relationship between said sensed physical parameter and previous observations of said sensed physical parameter by continously reinitiating said mathematical calculations until and after said parameter is within preselected limits indicative of satisfactory progress of said tool cutting said workpiece.

2. In a method of metalworking including the steps of:
(a) moving at least one of a workpiece and a cutting tool to thereby provide interfering relative motion between said workpiece and said tool whereby said tool cuts said workpiece; and
(b) vibrating said tool, by application of ultrasonic vibratory energy thereto, to enhance tool action in cutting said workpiece;
the improvement comprising:
(c) sensing a physical parameter indicative of progress of said tool in cutting said workpiece;
(d) producing an analog signal corresponding to said sensed physical parameter;
(e) changing vibratory amplitude of said tool in response to said analog signal until said parameter is within preselected limits indicative of satisfactory progress of said tool in cutting said workpiece by
(i) converting said analog signal to a digital input signal;
(ii) processing said digital input signal to generate a digital output signal reflecting desired vibrational amplitude of said tool;
(iii) converting said digital output signal to an analog output signal;
(iv) rectifying and filtering a time-varying line signal to produce an input pulse signal;
(v) generating an output square wave having period defined by period of said input pulse signal and amplitude defined by said analog output signal;
(vi) generating an output pulse signal having a period defined by said output square wave;
(vii) rectifying said time-varying line signal for a period defined by said output pulse thereby producing an output wave having energy content defined by width of said output pulse;
(viii) vibrating said tool with vibratory amplitude proportional to energy content of said output wave.

3. The method of claim 2 wherein said improvement further comprises:
(a) selecting a single analog signal from a plurality of analog signals corresponding to physical parameters indicative of progress of said tool in cutting said workpiece;
wherein said selecting step is performed after step (d) and prior to step (e) of claim 2.

4. The method of claim 2 wherein said physical parameter is temperature of said cutting tool.

5. The method of claim 2 wherein said physical parameter is strain in said cutting tool.

6. The method of claim 2 wherein said physical parameter is speed of a rotating shaft providing relative motion between said workpiece and said cutting tool.

7. The method of claim 2 wherein said physical parameter is power consumed by a motor turning a shaft providing relative motion between said workpiece and said cutting tool.

8. The method of claim 3 wherein said plurality of physical parameters includes at least one of the parameters of cutting tool temperature, cutting tool strain, speed of rotation of a shaft providing relative motion between said workpiece and said tool and power consumed by a motor providing said relative motion between said tool and said workpiece.

9. In a method of metalworking including the simultaneously performed steps of:
(a) moving at least one of a workpiece and a cutting tool to provide interfering relative motion between said tool and said workpiece to cut said workpiece to a predetermined pattern; and
(b) vibrating said tool at ultrasonic frequency to enhance tool performance in cutting said workpiece;
the improvement of regulating vibratory amplitude of said tool by regulating power input to means for mechanically vibrating said tool at frequency of said signal and amplitude proportional to power input to said signal generator, comprising the steps of:
(c) sensing a dynamic physical parameter indicative of action of said cutting tool in shaping said workpiece and converting said parameter into a time-varying analog voltage;
(d) sampling said time-varying analog voltage for a first preselected time interval;
(e) maintaining said voltage at the level sensed during said first preselected time interval;
(f) converting said maintained voltage to a digital input signal proportional to said maintained voltage level;
(g) processing said digital input signal to produce a digital output signal by:
(1) calculating a digital output value reflecting correlation of previously observed performance of said tool and previously measured values of said sensed physical parameter; and
(2) generating said digital output signal proportional to said calculated digital output value, from said digital input signal;
(h) converting said digital output signal to an analog output signal having amplitude proportional thereto;
(i) filtering and rectifying a first full wave power voltage to a first half wave power voltage;
(j) inverting and shaping said first half wave power voltage to produce first negative voltage pulses;
(k) converting said first negative voltage pulses into a second half wave positive voltage having wave period proportional to said analog output signal amplitude;
(l) inverting and shaping said second half wave positive voltage to produce second negative voltage pulses having period the same as said second half wave positive voltage;
(m) closing switches in a line carrying a second full wave power voltage, in response to and for the duration of said second negative voltage pulses, thereby providing a time varying output voltage, with amplitude defined by phase difference between said negative voltage pulses and said second full wave power voltage, for input to said means for mechanically vibrating said tool.

10. The method of claim 9 wherein said sensing step further comprises:
(a) simultaneously sensing a plurality of dynamic physical parameters indicative of action of said cutting tool in shaping said workpiece and converting said parameters into a corresponding plurality of time varying analog voltages;
wherein said sampling step further comprises:
(b) sequentially sampling said plurality of time varying analog voltages for first preselected time intervals;
wherein digital input signals produced from respective time varying analog voltages sampled during one sequence are retained in a memory device;
wherein said processing step further comprises:
(c) processing said retained digital input signals to produce a digital output signal by:
(1) calculating a digital output value reflecting correlation of previously observed performance of said tool and previously measured values of said sensed physical parameters; and
(2) generating said digital output signal, proportional to said calculated digital output value, from said digital input signals.

11. In metalworking apparatus including:
(a) a workpiece
(b) a cutting tool for shaping said workpiece;
(c) means for moving at least one of said tool and said workpiece to provide relative interfering motion between said tool and said workpiece to thereby cut said workpiece to a predetermined pattern;
(d) means for mechanically vibrating said tool at ultrasonic frequency as said tool contacts said workpiece, to enhance cutting action of said tool, in response to an input electrical signal of said ultrasonic frequency;
the improvement comprising:
(e) a transducer for continuously measuring a dynamic physical parameter indicative of progress of said tool in cutting said workpiece while said tool is cutting said workpiece and continuously producing a first output signal indicative of said parameter;
(f) means for continuously mathematically processing said first output signal to continuously produce new output signals defining a desired vibrational amplitude of said tool according to a preselected computational scheme involving at least one value of said physical parameter previously experienced during satisfactory cutting experienced during satisfactory cutting of a similar workpiece; and
(g) means for adjusting amplitude of said input electrical signal in response to said new output signal.

12. In metalworking apparatus including:
(a) a workpiece;
(b) a cutting tool for shaping said workpiece;
(c) means for moving at least one of said tool and said workpiece to provide relative interfering motion between said tool and said workpiece thereby to cut said workpiece to a predetermined pattern;
(d) means for mechanically vibrating said tool at ultrasonic frequency as said tool contacts said workpiece, to enhance cutting action of said tool, in response to an input electrical signal of said ultrasonic frequency;
the improvement comprising;
(e) a plurality of transducers for measuring physical parameters indicative of progress of said tool in cutting said workpiece and producing a first plurality of output signals indicative of said parameters;
(f) means for serially selecting and sampling output signals from said first plurality;
(g) means for continuously digitally processing said serially sampled output signals with digital representations of previously measured values of those signals to continuously produce a new output signal having energy content defining a desired vibrational amplitude of said tool, said desired vibrational amplitude reflecting said values of said physical parameters previously measured during satisfactory cutting of a workpiece;
(h) means for adjusting amplitude of said input electrical signal, in response to said new output signal, proportionally to said energy content of said new output signal.

13. In metalworking apparatus including:
(a) a workpiece;
(b) a tool for cutting said workpiece;
(c) means for moving at least one of said tool and said workpiece to provide relative interfering motion between said workpiece and said cutting tool to cut said workpiece to a preselected pattern;
(d) means for mechanically vibrating said cutting tool at ultrasonic frequency in response to an input electrical signal, amplitude of said input signal defining amplitude of vibration of said cutting tool, to enhance cutting action of said tool as said tool cuts said workpiece;
the improvement wherein amplitude of said input electrical signal is continuously regulated to control cutting tool operation comprising:
(e) a plurality of sensors for continuously sensing physical parameters indicative of progress of said tool in cutting said workpiece;
(f) a plurality of conditioning circuits coupled to said respective sensors for receiving sensor output and generating continuous analog voltages proportional thereto;
(g) multiplexer means for sequentially serially sampling output voltages from said conditioning circuits;
(h) amplifier means for serially producing voltages corresponding to levels of said voltages sampled by said multiplexer;
(i) first conversion for sequentially converting said voltages produced by said amplifier means to digital signals;
(j) microprocessor means for processing said digital signals to produce a digital output signal defining a desired vibrational amplitude of said cutting tool, said desired vibrational amplitude reflecting values of said physical prameters previously experienced during satisfactory cutting of a workpiece;
(k) memory means connected to said microprocessor means, for storing said digital signals received by said microprocessor means and intermediate data computed by said microprocessor means in the course of producing said digital output signal;
(l) programmable read-only memory means connected to said microprocessor means, for storing instructions for execution by said microprocessor in processing said digital signals to produce said digital output signal;
(m) second conversion means for converting said digital output signal to an analog output signal;
(n) inverting and shaping means for producing a first pulse signal from an input sinusoidal signal;
(o) square wave generation means for generating an output square wave, having duty cycle proportional to level of said analog output signal, from said time varying pulse signal;

(p) pulse generation means for generating a second pulse output signal from the output of said square wave generation means, second pulse width being defined by said square wave duty cycle;

(q) rectifier means, operating in response to said second pulses produced by said pulse generation means, for providing as output the portion of a sinusoidally varying input voltage having period congruent with said second pulse produced by said pulse generation means.

14. Apparatus of claim 13 wherein at least one of said sensors is a means for sensing temperature of said cutting tool.

15. Apparatus of claim 13 wherein at least one of said sensors is a means for sensing strain in said cutting tool.

16. Apparatus of claim 13 wherein at least one of said sensors is a means for measuring power consumed by a motor providing said means for moving at least one of said tool and said workpiece.

17. Apparatus of claim 13 wherein at least one of said means is a means for measuring speed of a rotary shaft affecting relative motion between said tool and said workpiece.

18. In a method of metalworking including the steps of:

(a) moving at least one of a workpiece and a cutting tool to thereby provide interfering relative motion between said workpiece and said tool whereby said tool cuts said workpiece; and (b) vibrating said tool, by application of ultrasonic vibratory energy thereto, to enhance tool action in cutting said workpiece;

the improvement comprising:

(c) continously serially sensing a plurality of physical parameters indicative of progress of said tool in cutting said workpiece while said tool is cutting said workpiece;

(d) continuously serially producing an analog signal corresponding to at least one of said sensed physical parameters;

(e) continuously converting said analog signal to a digital input signal;

(f) continuously mathematically processing said digital input signal using data reflecting previous successful metalworking of similar workpieces to continuously generate serial digital output signals reflecting desired vibrational amplitude of said tool;

(g) continuously converting said serial digital output signals to an analog output signal;

(h) continously vibrating said tool in response to said analog output signal.

19. In a method of metalworking including the simultaneously performed steps of:

(a) moving at least one of a workpiece and a cutting tool to provide interfering relative motion between said tool and said workpiece to cut said workpiece to a predetermined pattern; and (b) vibrating said tool at ultrasonic frequency to enhance tool performance in cutting said workpiece;

the improvement of regulating vibratory amplitude of said tool by regulating power input to means for mechanically vibrating said tool comprising the steps of:

(c) sensing a dynamic physical parameter indicative of action of said cutting tool in shaping said workpiece and converting said parameter into a time-varying analog voltage;

(d) converting said analog voltage to a digital input signal;

(e) processing said digital input signal to produce a digital output signal by:
  (1) calculating a digital output reflecting correlation of previously observed performance of said tool and previously measured values of said sensed physical parameter; and
  (2) generating said digital output signal proportional to said calculated digital output value from said digital input signal;

(f) converting said digital output signal to an analog output signal;

(g) vibrating said tool in response to said analog output signal with amplitude proportional to energy content of said analog output signal.

20. In metalworking apparatus including:

(a) a workpiece;

(b) a tool for cutting said workpiece;

(c) means for providing relative interfering motion between said workpiece and said cutting tool to cut said workpiece;

(d) means for vibrating said cutting tool at ultrasonic frequency in response to an input electrical signal, the improvement wherein amplitude of said input electrical signal is regulated to control cutting tool operation comprising:

(e) means for sensing physical parameters indicative of progress of said tool in cutting said workpiece;

(f) means for sequentially serially sampling output signals from said sensing means;

(g) means for sequentially converting said sampled sensing means signals to digital signals;

(h) means for processing said digital signals to produce a digital output defining a desired vibrational amplitude of said cutting tool reflective of at least some of said physical parameters previously experienced during satisfactory cutting of a similar workpiece;

(i) memory means connected to said processing means, for storing said digital signals received by said processing means and intermediate data computed by said processing means in the course of producing said digital output;

(j) programmable means connected to said processing means, for storing instructions used by said processing means in producing said digital output;

(k) means for regulating amplitude of said input electrical signal in response to said digital output.

* * * * *